(12) United States Patent
Palmer (10) Patent No.: US 9,080,061 B2
(45) Date of Patent: Jul. 14, 2015

(54) COATING RESINS AND COATING WITH MULTIPLE CROSSLINK FUNCTIONALITIES

(75) Inventor: M. Margaret Palmer, Carlisle, MA (US)

(73) Assignee: Surface Solutions Laboratories, Carlisle, MA (US), `

( * ) Notice: Subject to any disclaimer, the term of this patent is extended or adjusted under 35 U.S.C. 154(b) by 0 days.

(21) Appl. No.: 11/744,193

(22) Filed: May 3, 2007

(65) Prior Publication Data

US 2007/0286959 A1 Dec. 13, 2007

Related U.S. Application Data

(60) Provisional application No. 60/797,404, filed on May 3, 2006.

(51) Int. Cl.
*B05D 3/02* (2006.01)
*C09D 5/02* (2006.01)
*C09D 175/04* (2006.01)
*C09D 175/16* (2006.01)

(52) U.S. Cl.
CPC ............. *C09D 5/024* (2013.01); *C09D 175/04* (2013.01); *C09D 175/16* (2013.01)

(58) Field of Classification Search
CPC ..... C09D 5/024; C09D 175/04; C09D 175/16
USPC .................................................... 427/385.5
See application file for complete search history.

(56) References Cited

U.S. PATENT DOCUMENTS

| | | | |
|---|---|---|---|
| 3,619,842 A | 11/1971 | Maierson | |
| 3,629,392 A | 12/1971 | Banker et al. | |
| 3,669,729 A | 6/1972 | Seiner | |
| 3,671,333 A | 6/1972 | Mosier | |
| 3,777,015 A | 12/1973 | Zaffaroni | |
| 3,860,490 A | 1/1975 | Guttag | |
| 4,100,309 A | 7/1978 | Micklus et al. | |
| 4,119,094 A | 10/1978 | Micklus et al. | |
| 4,331,783 A | 5/1982 | Stoy | |
| 4,337,327 A | 6/1982 | Stoy | |
| 4,369,294 A | 1/1983 | Stoy | |

(Continued)

FOREIGN PATENT DOCUMENTS

EP 0166998 1/1986
EP 0483941 5/1992

(Continued)

OTHER PUBLICATIONS

Fouassier et al. "Radiation Curing in Polymer Science and Technology: Polymerisation Mechanisms" vol. 3 (1993).*

(Continued)

*Primary Examiner* — Robert S Walters, Jr.
(74) *Attorney, Agent, or Firm* — Wilmer Cutler Pickering Hale and Dorr LLP (57) ABSTRACT

A coating composition includes a matrix polymer containing functional moieties capable of undergoing crosslinking reactions and at least one crosslinker, wherein the crosslinker and functional moieties are selected such that a reaction to form the crosslinks occurs sequentially by either heat/UV, partitioning between the phases, and or the generation of other functional groups by first crosslinker's reaction with the backbone functions. The matrix polymer may optionally be dispersed or emulsified in water or other non-solvent.

15 Claims, 5 Drawing Sheets

(56) References Cited

U.S. PATENT DOCUMENTS

| | | | |
|---|---|---|---|
| 4,370,451 | A | 1/1983 | Stoy |
| 4,379,874 | A | 4/1983 | Stoy |
| 4,420,589 | A | 12/1983 | Stoy |
| 4,487,808 | A | 12/1984 | Lambert |
| 4,521,551 | A | 6/1985 | Chang et al. |
| 4,589,873 | A | 5/1986 | Schwartz et al. |
| 4,605,698 | A * | 8/1986 | Briden .......... 524/559 |
| 4,642,267 | A | 2/1987 | Creasy et al. |
| 4,729,914 | A | 3/1988 | Kliment et al. |
| 4,789,720 | A | 12/1988 | Teffenhart |
| 4,801,475 | A | 1/1989 | Halpern et al. |
| 4,810,543 | A | 3/1989 | Gould et al. |
| 4,847,324 | A | 7/1989 | Creasy |
| 4,876,126 | A | 10/1989 | Takemura et al. |
| 4,943,460 | A | 7/1990 | Markle et al. |
| 5,001,009 | A | 3/1991 | Whitbourne |
| 5,041,100 | A | 8/1991 | Rowland et al. |
| 5,066,705 | A | 11/1991 | Wickert |
| 5,077,352 | A | 12/1991 | Elton |
| 5,155,090 | A | 10/1992 | Aono et al. |
| 5,157,069 | A | 10/1992 | Campbell |
| 5,331,027 | A | 7/1994 | Whitbourne |
| 5,478,872 | A | 12/1995 | Yamasoe et al. |
| 5,556,429 | A | 9/1996 | Felt |
| 5,558,900 | A | 9/1996 | Fan et al. |
| 5,582,794 | A | 12/1996 | Hagiwara et al. |
| 5,599,576 | A | 2/1997 | Opolski |
| 5,608,000 | A | 3/1997 | Duan et al. |
| 5,620,765 | A | 4/1997 | Shaw-Klein et al. |
| 5,658,617 | A | 8/1997 | Gobel et al. |
| 5,747,166 | A | 5/1998 | Schwarte et al. |
| 5,753,740 | A | 5/1998 | Odawa et al. |
| 5,763,529 | A | 6/1998 | Lucas |
| 5,766,158 | A | 6/1998 | Opolski |
| 5,767,188 | A | 6/1998 | Kamikuri et al. |
| 5,919,570 | A | 7/1999 | Hostettler et al. |
| 6,117,492 | A * | 9/2000 | Goldstein et al. .......... 427/391 |
| 6,238,799 | B1 | 5/2001 | Opolski |
| 6,525,112 | B1 * | 2/2003 | Bammel .......... 523/404 |
| 6,683,062 | B2 | 1/2004 | Opolski |
| 6,852,771 | B2 * | 2/2005 | Balch et al. .......... 522/135 |
| 6,866,936 | B2 | 3/2005 | Opolski |
| 2003/0203991 | A1 * | 10/2003 | Schottman et al. .......... 523/334 |

FOREIGN PATENT DOCUMENTS

| | | |
|---|---|---|
| WO | WO-9311751 | 6/1993 |
| WO | WO-9506670 | 3/1995 |

OTHER PUBLICATIONS

Brynda et al. "Polyethylene/hydrophilic polymer blends for biomedical apoplications" Biomaterials 8:57-60 (Jan. 1987).

Fan, Y.L. "Hydrophilic Polymers (for Friction Reduction)" appearing in Polymeric Materials Encyclopedia J.C. Salomone:Ed. CRC Press, New York 1996 pp. 3107-3115.

\* cited by examiner

Formation of methylene ether link

Formation of methylene link

Figure 5

COATING RESINS AND COATING WITH MULTIPLE CROSSLINK FUNCTIONALITIES

RELATED APPLICATIONS

This application claims the benefit of priority under 37 U.S.C. §119(e) to co-pending application Ser. No. 60/797,404 filed May 3, 2006, entitled "Coatings/Adhesives with improved durability, adhesion, loading and resistance by the use of multiple crosslinking methods," the contents of which are incorporated by reference.

BACKGROUND

Polymeric compositions have been used as surface coatings in medical applications, anti-fog applications and ink-absorbing (or printing) applications. However, the known compositions may be improved or have drawbacks discussed below.

A variety of polymers have been used as coatings for medical devices, e.g. polyethylene oxide (PEO), polyethylene glycol (PEG), polyvinyl pyrrolidone (PVP), polyurethane (PU), polyacrylates and methacrylates (PMA, PHEMA etc). Each of the polymeric types mentioned are hydrophilic polymers alone, and as such, are water soluble and will not form durable coatings unless bonded or somehow restrained at the surfaces. The incorporation of binder resins, or copolymer modifications to minimize the water solubility improves durability of these coatings.

Accordingly, polyvinyl pyrrolidone (PVP) has been suggested for use as a medical device coating alone or in combination with other polymers. For example, polyvinyl pyrrolidone may be bonded to a substrate by thermally activated free radical initiators, UV light activated free-radical initiators, or E-beam radiation. One disadvantage of using such coatings is that high energy radiation such as E-beam radiation can be deleterious to some of the materials used in medical devices and is restricted to "line-of-sight" cure as the radiation must contact the coating and its initiator molecules in order to provide for polymerization to occur.

PVP is generally used in solvent and/or water based formulations in combination with other polymers. One such coating is made from a copolymer of PVP and glycidyl acrylate. This coating relies on the presence of amino groups on the surface of the substrate to react with the epoxy groups of the glycidyl acrylate to covalently bond the PVP-containing copolymer to the substrate. Many substrates, including silicone rubber, do not contain any free amino groups, and thus this type of coating cannot form covalent bonds with the surface of the silicone substrate, resulting in poor adhesion. This polymer suffers from the same restrictions as the radiation cured coatings discussed above.

Other suggested coatings are composed of a mixture of PVP and polyurethane. These coatings provide low friction surfaces when wet. One such coating is a polyvinyl pyrrolidone-polyurethane interpolymer with strong hydrogen-bonding between the PVP and the urethane/urea groups. Another such coating is composed of hydrophilic blends of PVP and linear preformed polyurethanes, again relying on the strong hydrogen bonding of the blends. In addition, PVP may be incorporated into a polyurethane network by combining a multifunctional polyisocyanate and a multifunctional polyol with a PVP solution and initiating polymerization of the polyurethane around the PVP. Still another such coating is composed of two layers: a primer and a top coat. The primer coat is a polyurethane prepolymer containing free isocyanate groups, while the top coat is a hydrophilic copolymer of PVP and a polymer having active hydrogen groups, such as acrylamide. The two layers react together to form a robust coating. In each of these coatings, the urethane polymer associated with the PVP determines the properties of the coating and the degree to which there is hydrogen-bonding between the two polymers. Additionally unreacted prepolymer can dissolve into the topcoat destroying the integrity of the primer.

Water-based polyurethane coating compositions can provide medical devices with hydrophilic surfaces. The coatings contain a hydrophilic polymer such as polyvinylpyrrolidone, polyethylene oxide or methylcellulose imbedded in a polyurethane matrix so that the article becomes slippery and lubricious when wet. These polymers have been used in combination with various other materials to produce improved lubricious coatings for devices such as general medical tubing, catheters, guidewires, stents and alike. As for previous polymer blend coatings, the amount of hydrogen bonding determines the durability of the slip.

Improvements over the hydrogen bonding of a urethane matrix to the hydrophilic polymer has been made by using a urethane matrix which contains reactive species such an organic acid or amine. These functions can react with low molecular weight multifunctional crosslinkers such as aziridines, carbodiimides and the like. These multifunctional crosslinkers can have one or two attachment on the polymer in the coating and another attachment, for example, an organic acid available on the substrate surface to provide adequate and improved adhesion to the substrate. This three dimensional matrix allows improved adhesion, as well as a matrix formation that supports and contains the hydrophilic polymer over and above the simple hydrogen bonding mentioned above. Increased durability of the coating's slip which is derived from retained hydrophilic polymers is the result. The network crosslink density must be controlled to allow for slip with durability.

Coatings incorporating PEO and isocyanates have also been suggested. Polyols may be combined with PEO/isocyanate coatings to produce a crosslinked polyurethane network, thereby entrapping the PEO. However, such coatings generally have the same drawbacks as discussed above. The proportion of hydrophilicity, the selection of other polyols and the stoichiometric ratios of isocyanate to polyol, as well as atmospheric conditions and potlife issues can be difficult to control and all impact the successful use of these coatings.

Methods for providing a medical apparatus with a protective surface coating have also been suggested to make the medical apparatus scratch and puncture resistant. The protective coating comprises a polymeric matrix consisting of a water-based urethane, acrylic or epoxy and uses elevated curing temperatures. Plasma or corona pretreatments or the use of a primer is suggested. The polymeric matrix is reinforced by lamellar or fiber-like agents such as micaceous pigments, glass fiber or tungsten powder for higher surface hardness. The coating also comprises polyfunctional aziridine, carbodiimides, urea formaldehyde, melamine formaldehyde, crosslinker condensates, epoxies, isocyanates, titanates, zinc compounds or silanes as crosslinkers. The crosslinkers are added optionally to provide improved hardness, adhesion and chemical and water resistance. The coating further comprises an anti-slip additive or antimicrobials or therapeutic agents.

A multicomponent complex for sustained delivery of bioeffective agents has also been suggested in which the bioeffective agent is anchored by covalent bonds with aziridines, epoxys, formaldehydes or metal esters such as titanates or zircoaluminates to a urethane on a medical device made of steel or urethane. The preferred covalent bonds for a cleavable linkage under hydrolysis reaction are esters. Hydroxy-terminal hydrophilic materials such as polyethylene oxide can be co-reacted to improve hydrophilicity. Alternatively a multilayer polymeric system can be used with up to three layers.

It has also been suggested to achieve slip by mixing urethane with a PTFE, wax, silicone or siloxane emulsion. The carboxylic acid groups of the substrate and coating may then be linked with a cross-linking agent, such as a polyfunctional aziridine. The siloxane emulsion is dispersed in the urethane polymer and "blooms" to the surface, lubricating the surface and replenishing itself from reservoirs in the coating. Fugitive, silicones and waxes can be difficult to contain in manufacturing and will cause problems with other bonding and coating operations when they contaminate the manufacturing areas.

It has been suggested to apply solutions of polyvinylpyrrolidone with isocyanate and/or polyurethane in multi-step operations. However, these coatings often lack good durability. Moreover, it is difficult to control the exact composition of the final coating, because the composition is a complex function of several factors, such as the amounts of each of the coating solutions that happen to deposit on the substrate, the amount of the first coating that happens to react with other material before the top coat is applied, or the amount of the first coating that re-dissolves when the additional coating is applied. Coating composition uniformity of these multi-step coatings is further complicated because, during dip coating, different parts of the same object are likely to see different dwell times and therefore the amount of the first component that re-dissolves is variable. Multiple step coating processes are also more complex and more time, labor, and material intensive. Furthermore, these are usually solvent based.

Many of these coatings have insufficient adhesion to substrates such as silicone, polished stainless steel, PE, PEBAX and the like. Because these coatings do not form linkages with the surface of the substrate, they have poor adherence and durability and are relatively easily rubbed off from the surface when wetted. Even when achieving good wetting of the surface with strong solvents and incorporation of highly reactive functionalities, the adhesion can be less than ideal.

As a result, these coatings often require surface pretreatments and/or priming. Chemical pretreatments such as "tetra etch" for PTFE and corona, plasma or gas/flame pretreatments can successfully create functional groups at the surface that allow for covalent linkage to the reactive materials in the coating. Primers can include materials that react with or bind to the substrate with some functionality to allow wetting and adhesion of a subsequently applied coating. Roughening of the surface can expose polymer without processing aids and increase the mechanical interpenetration with the surface.

Thus there is still a need for coatings for medical applications which can be applied economically, are biocompatible provide improved adhesion to the substrate being coated, e.g. the medical device, improve loading capacity for other (hydrophilic) polymers and additives such as drugs, and improve durability while also providing improved lubricity (or reduced coefficient of friction) when the surface of the coating is contacted with water, blood or body fluids.

SUMMARY

Coating resins with multiple functionalities crosslinks and coatings are described. The coatings demonstrate excellent durability, adhesion, loading and resistance. The coating resins provide multiple crosslinkers of different modalities, which are capable of forming a variety of crosslinks with a variety of reactive species. Due to the variety of crosslinking modalities, the resultant multiple crosslinked coating is capable of improved crosslinking thereby being able to carry, a higher load, e.g., more of a functional or therapeutic filler, than those using only one functional crosslinking material. Medical and industrial applications for loading with functional additives, drug delivery and hydrophilicity are envisioned.

Improvements in coatings are envisioned to arise from an increase in crosslink density without a concomitant increase-decrease in equivalent weight and/or the formation of crosslinks of different chemical type within the same polymer system.

In one aspect of the invention, a coating is provided having a highly crosslinked network formed in-situ during drying and curing, which can hold more of a functional or therapeutic material (either bonded or unbonded), because of the increased network linkages.

According to one embodiment, a hydrophilic, lubricious organic coating is provided which retains its lubricity when wetted even after prolonged contact to water or aqueous solutions, and even after repeated moistening/drying cycles.

According to one embodiment, the hydrophilic, lubricious organic coating is versatile and has good adherence to a multitude of substrates due to the increased range of functionally reactive species contained therein.

According to one embodiment, the coatings are non-toxic and non-harmful to the body.

According to one embodiment, a hydrophilic, lubricious organic coating having the qualities set forth in the preceding embodiments, is applied from a single coating solution.

According to one embodiment, the coating can accommodate a drug and is suitable for drug delivery including a drug release with a distinct release profile depending on the effective dosage requirement over time for the individual medical device the coating to which it is applied to.

According to one embodiment, the coating can accommodate appropriate inorganic fillers and pigments, including colored, protective and reflective, as well as radio-opaque or other energy modifying agents which adsorb, phosphoresce, fluoresce light of varying wavelengths with or without a combination of hydrophilic or controlled drug release for enhanced visibility or functionality of the coated medical devices.

In one aspect, a coating composition includes a matrix polymer containing functional moieties capable of undergoing crosslinking reactions, said matrix polymer dispersed or emulsified in water; and first and second crosslinkers, wherein the first crosslinker and matrix polymer are selected such that the second crosslinker is stable or non-reactive under conditions sufficient to form a crosslink between the first crosslinker and the matrix polymer.

In one or more embodiments, the coating composition further comprises a hydrophilic water-soluble organic monomer, oligomer, prepolymer, polymer or copolymer.

In one or more embodiments, the first crosslinker is a chemical crosslinker, and the first crosslinker is selected to provide a reaction product with the functional moieties of the matrix polymer that is capable of undergoing subsequent crosslinking with the second crosslinker or the first crosslinker is selected from the group consisting of aziridines, isocyanates, and epoxies.

In one or more embodiments, the second crosslinker is a chemical crosslinker, and the second crosslinker is selected from the group consisting of melamines, epoxies, isocyanates, aziridines, carbodiimides, blocked isocyanates, and blocked melamines.

In one or more embodiments, the first crosslinker is a degree of unsaturation in the matrix polymer, and the second crosslinker is a chemical crosslinker.

In one or more embodiments, the first crosslinker and the second crosslinker are located in the same compound.

In one or more embodiments, the compound is a silane functionalized with a reactive group that is reactive with the functional groups of the matrix polymer, and the reactive group is selected from the group consisting of melamines, epoxies, isocyanates, aziridines, carbodiimides, blocked isocyanates, and blocked melamines and unsaturation.

In one or more embodiments, the first crosslinker comprises a self-crosslinking component in the matrix polymer, and the second crosslinker is selected from the group consisting of melamines, epoxies, isocyanates, aziridines, carbodiimides, blocked isocyanates, and blocked melamines and unsaturation.

In one or more embodiments, the first crosslinker comprises a self-crosslinking component in the matrix polymer, and the second crosslinker is selected from the group consisting of melamines, expoxies, isocyanates, aziridines, carbodiimides, blocked isocyanates, and blocked melamines and unsaturation.

In one or more embodiments, the first crosslinker comprises aziridine and the second crosslinker is selected from the group consisting of melamines, epoxies, isocyanates, and carbodiimides.

In one or more embodiments, the first crosslinker is soluble with the matrix polymer and the second crosslinker is substantially located in the aqueous or secondary phase.

In one or more embodiments, the matrix polymer may be selected from the group consisting of polyacrylates, polymethacrylates, polyurethanes, polyethylene and polypropylene co-difunctional polymers, polyvinyl chlorides, epoxides, polyamides, polyesters and alkyd copolymers, and the functional moiety is selected from the group consisting of amino, hydroxyl, amido, carboxylic acid and derivatives thereof, sulfhydryl (SH), unsaturated carbon bond and heteroatom bonds, N—COOH, N(C=O)H, S(OR), alkyd/dry resin, formaldehyde condensate, methyol acrylamides and allylic groups.

In another aspect, a method of coating a surface includes providing a coating composition to a surface, said composition comprising a matrix polymer containing functional moieties capable of undergoing crosslinking reactions, said matrix polymer dispersed or emulsified in water; and first and second crosslinkers, wherein the first crosslinker and matrix polymer are selected such that the second crosslinker is stable or non-reactive under conditions sufficient to form a crosslink between the first crosslinker and the matrix polymer; forming a crosslink with the first crosslinker and the polymer matrix in a first crosslinking step; and subsequently forming a crosslink with the second crosslinker and the polymer matrix in a second linking step.

In one or more embodiments, the first crosslinker is a chemical crosslinker and the first crosslinking step comprises crosslinking the functional moieties of the matrix polymer and the crosslinker to provide a reaction product with the functional moieties of the matrix polymer that is capable of undergoing subsequent crosslinking with the second crosslinker.

In one or more embodiments, the second crosslinking step comprises reacting the second crosslinker with the reaction product of the first crosslinking step.

In one or more embodiments, the second crosslinker is non-reactive in the coating until after the first crosslink step.

In one or more embodiments, the first crosslinker comprises a degree of unsaturation and the polymer matrix comprises a degree of unsaturation and the first crosslinking step comprises forming a crosslink using photoinitiation.

In one or more embodiments, the second crosslinker is a chemical crosslinker and the step of forming a second crosslink comprising forming a crosslink between the functional moieties of the matrix polymer and the second crosslinker.

In one or more embodiments, the first crosslinking step is carried out at a first lower temperature and the second crosslinking step is carried out at a second higher temperature, wherein the second crosslinker is not reactive at the first lower temperature, or the first crosslinker is aziridine and the second crosslinker is melamine.

In one or more embodiments, the first crosslinker comprises a self-condensing moiety in the polymer matrix and the first crosslinking step comprises forming a crosslink using polymer-polymer self-condensation, and the second crosslinker is a chemical crosslinker and the step of forming a second crosslink comprising forming a crosslink between the functional moieties of the matrix polymer and the second crosslinker.

In one or more embodiments, the first crosslinker and the second crosslinker are located on a single compound and the compound includes a free reactive group and a blocked reactive group; wherein the first crosslinking step is carried out with the free reactive group to form a first crosslink, and the second crosslinking step comprises removing the block to obtain a second reactive group and forming a crosslink with the second crosslinker and the crosslinked matrix polymer.

In one or more embodiments, the coating composition is applied to the surface in a single application.

In another aspect, a method of coating a surface includes providing a coating composition comprising a matrix polymer containing functional moieties capable of undergoing crosslinking reactions, said matrix polymer may optionally be dispersed or emulsified in water or other non-solvent; and at least one crosslinker, wherein the crosslinker and functional moieties are selected such that a reaction to form at least two different crosslinks occurs sequentially by either heat/UV, partitioning between the phases, and or the generation of other functional groups by first crosslinker's reaction with the backbone functions.

BRIEF DESCRIPTION OF THE DRAWING

The following figures are presented for the purpose of illustration only, and are not intended to be limiting.

DETAILED DESCRIPTION

Coating resins and coatings are durable and easy to apply as surface treatment for medical devices, pharma, construction, textile, recreational, veterinary, commercial and industrial water and air handling surfaces, anti-static and antifog, and ink-other receptive surfaces. The properties, e.g., durability and lubricity, may be tailored by controlling the crosslink density and network properties of the coating. For example, containment vs. release properties (for release of drugs or other additives) may be modified by changes in network properties and reactive moieties. The adhesion to specific surfaces can be enhanced by use of more reactive functionalities for the resin. Coating integrity with increased loading of additives is maintained as well. Coating resins can be frothed or spray dried to form foams, films or particles.

The coating resins are advantageously water-based resin-coatings. While not restricting the claimed coatings to exclusively water-based systems, those based on water will present certain handling and economic advantages. Water-based coatings do not present the toxicity and flammability issues related to their organic solvent (and often UV cure) counterparts. As a result there are generally fewer requirements for venting, with associated heating and cooling requirements. Insurance regulations and concerns are much reduced with attendant savings in premiums. Waste disposal and storage in the plant, while still regulated is significantly less expensive than the explosion-proofing and hazardous waste procedures required for solvents. UV cure systems typically contain reactive diluents that place them in the same flammable/hazard categories as solvents. And just as latex versus oil based paints, when clean up and worker satisfaction is measured, the water-based is certainly favored.

Conveniently and advantageously, the carrier solvent of the coating resin is based on water or other non-solvent. The formulated coating has good stability and shelf life. The coating process or application is safe, cost and time effective without extensive equipment or surface preparation. The coating may not require use of an additional primer, thus being a one system coating composition. It is dry to the touch in a reasonable drying or curing time, and does require curing at elevated temperature. The coating has good long-term adhesion and good stability over extended service time, and is tough but flexible towards abrasion and substrate temperature or mechanical dynamics. In combination with good abrasion resistance, it has extensive hydrophilicity with good long-term lubricity, anti-fog property, ink absorbing ability without blocking tendency. The cured coating does not leach or bleed out any undesired components, thus maintaining good transparency In addition to chemically bonding certain useful agents for biological or identification purposes, such a coating also has the flexible architecture of encapsulating specific agents with time and concentration programmable release patterns for protective or therapeutic purposes. Moreover, the coating itself has a reasonable toxicological profile thus being benign to the environment where its lubricity, controlled release, anti-fog or absorbing properties are intended.

In one aspect, an aqueous coating composition for providing a durable, hydrophilic, lubricious coating includes a coating resin and crosslinking system having multiple modes of crosslinking. According to some embodiments of the coating composition, the aqueous coating includes a backbone polymer and at least two crosslinking mechanisms which can react with different functionalities on the backbone, or with the reaction product of one of the crosslinking chemistries. In some embodiments, the aqueous coating composition includes a matrix polymer containing functional moieties capable of undergoing crosslinking reactions dispersed or emulsified in water; a hydrophilic water-soluble organic monomer, oligomer, prepolymer, polymer or copolymer; and at least one crosslinker. In combination, the crosslinker(s) and the polymeric carrier provide at least two different crosslinking mechanisms for forming at least two different types of crosslink in the final coating. The crosslinker and the matrix polymer are selected so that the second crosslinking mode is stable or non-reactive under conditions favorable to the first crosslinking mode. The coating composition is capable of forming a coating having multiple crosslinking modes in a single coating application.

By "mode" of crosslinking, it is meant a mechanism of crosslinking. However, multiple modes do not necessarily require multiple crosslinkers. According to one or more embodiments, multiple crosslinking modes can arise from self-condensation between polymer chains, covalent crosslinking, ionic crosslinking, and/or photo-initiated crosslinking. The multiple crosslinking modes may arise from a single crosslinker that is capable of two different linking mechanisms, either because the crosslinker includes multiple, different functional sites, or because the second and subsequent linking functionality is generated during the first linking step.

The first and second crosslinking steps are sequential. Sequential crosslinking steps are hypothesized to be advantageous in an aqueous and other dispersion coating composition because it minimizes the exposure time of the reactive groups in water, which can prevent premature reaction and/or degradation of crosslinker.

In one or more embodiments, the coating resin and crosslinking system includes a matrix polymer containing functional moieties capable of undergoing crosslinking reactions dispersed or emulsified in water. When reacted with a first crosslinker, the crosslink that is forms possesses yet another functional group specific for a second cure chemistry. The first crosslinking step can generate a reactive group that can then react with unreacted functional groups remaining on the matrix polymer or with another reactive group arising from the first crosslink reaction. Alternatively, the coating composition may contain more than one crosslinker. In one or more embodiments, the first crosslinking step generates a reactive group that then reacts with a second crosslinker of the coating composition. The second crosslinker is stable in the coating composition, i.e., it does not react directly with the matrix polymer, but is reactive with the reactive groups generated in the first crosslinking step.

In some embodiments, the first and second crosslinking steps are carried out under different crosslinking conditions, so that the first crosslinking step is formed under a first set of crosslinking conditions and the second crosslink step is carried out using a second set of crosslinking conditions. Crosslinking conditions may be varied by controlling temperature, applying uv energy, or by phase separating the crosslinker from the polymer.

By way of example, the aqueous coating composition includes a matrix polymer containing functional moieties capable of undergoing crosslinking reactions dispersed or emulsified in water, a first crosslinker that reacts at a first lower temperature and a second crosslinker that reacts at a second higher temperature. The first crosslinking reaction can be carried out by reacting a functional moiety of the matrix polymer with a first crosslinker at room temperature to form a first crosslink. The coating composition is thereafter and sequentially heated to an elevated temperature where the second crosslinking reaction occurs. The crosslinking reaction may also generate a second reactive group.

In other embodiments, a coating composition may include an unsaturated matrix polymer with functional groups capable of undergoing crosslinking reactions dispersed or emulsified in water. The first crosslinking reaction can be carried out by reacting a functional moiety of the matrix polymer with a first crosslinker at room temperature to form a first crosslink. The coating composition is thereafter and sequentially exposed to uv energy to initiate a photo-initiated crosslink to form a second crosslink in the coating composition. Alternatively, the crosslinker may include both functional groups for forming a chemical crosslink and unsaturation for uv-initiated polymerization.

In another embodiment, a reactive ionic functionality on the polymer backbone is neutralized to remain unreactive until the removal of the counterion. This is one way of "masking" a functional group by blocking its activity with counterion or blocking agent, or preventing its interaction with a catalyst or reactive group like water. Upon removal of the counter ion, for example, by solvent change or fugitive counterion's evaporation, a first crosslinker that is present in the coating composition can react with the ionic group in the backbone, to form a crosslink and create a new functional group which can participate in further reactions with a second crosslinker. The multiple functions may "self cure" upon counterion removal (typical anionic and cationic neutralized emulsions of acrylic or urethane) or unblocking of a blocked isocyanate (ketamine blocked), catalyst blocked (PTSA catalyst for melamine and UF reactions), or addition of ambient moisture (silane/isocyanate). As in the examples provided above, the second crosslinker can be present in the coating composition, but it is not reactive until the new functional group is formed.

In yet another embodiment, the sequential reaction for forming different crosslinks is controlled by localizing different crosslinkers in different phases or regions of the coating composition resins. Thus, by way of example, the coating composition is an emulsion having micelles that favor the organic (polymer-containing) component and an aqueous phase. A first crosslink may be compatible with the organic phase and a second crosslink may be compatible with the water phase. Incompatibility of one crosslinker in the micelle of the resin emulsion can allow the reaction within the micelle to complete with subsequent reaction with the more incompatible material upon film formation. In use, a layer is deposited from the coating composition, in which a first crosslinker is contained predominantly in the micelles that also contain the matrix polymer. Crosslinking of the first crosslink takes place within the emulsion micelles and the second crosslink is substantially excluded from the organic phase. Upon drying and when the first crosslinking reaction is substantially complete, the second crosslink is concentrated with the polymer emulsion and a second crosslink reaction can take place. The second crosslinking step can be initiated, either directly with any unreacted functional moieties of the matrix polymer or with a new reactive species that is generated from the first crosslinking step, or both.

In other embodiments, any unreacted multifunctional crosslink reagent may also react with the substrate surface, resulting in a strong adhesive bond with the surface. Any unreacted crosslinking functional moieties can be neutralized, e.g., hydrolyzed, after polymerization is complete (or at any suitable time). The resultant polymer network contains two different crosslinks generated in two different sequential crosslinking steps. The network is complex and provides a robust polymer matrix without the need to lower the equivalent weight of the matrix polymer to increase crosslink density.

Many reactive systems are known and may be used in the coating composition. Various types of crosslinkers can be employed.

In one or more embodiments, a crosslinking agent may have multiple crosslinking functionality types (including the ability to form functionality types when crosslinked), each functionality type being capable of forming a crosslink with the matrix polymer or the substrate. Exemplary crosslinkers include carbodiimides, melamines, epoxies, isocyanates, aziridine, and silanes. Most silanes have dual functionality, so that there is no need for the silane to generate an additional functionality during crosslinking. Since the silane end reacts with OH groups or even oxides, the second functionality is then available for other reaction. These second functionalities are sulfhydryl, isocyanate, epoxy, unsaturation, amine and the like.

In one or more embodiments, the crosslinker is a multifunctional isocyanate, epoxy or other crosslinker with unsaturation built in. The unsaturation provides a means to provide a second mechanism of crosslinking when exposed to UV and perhaps heat.

For example, polyfunctional aziridine crosslinker can be used to crosslink polymers with reactive amine or carboxyl functionalities. According to the following reaction scheme:

Polyfunctional epoxy crosslinker can be used to crosslink polymers with reactive amine or carboxyl functionalities. Epoxy functionality can react with COOH and amines. In either case, the ring opens to form an OH group per the following reaction:

In either of the above reaction schemes, the OH or NH groups can be the target groups for subsequent reactions, for example with isocyanates, carbodiimides, or melamines.

In a similar manner, isocyanates react with a variety of functional groups to form covalent linkages. Polyfunctional isocyanates can react with reactive alcohol, amines, amides and ureas groups, as are shown in the following reaction schemes. Each of these reactions generate a secondary amine group. A more reactive primary amine can be generated in a moisture cure (e.g., reaction with water to give off $CO_2$) that can be used in a second crosslinking reaction. This is the essence of moisture-curing reaction for urethane coatings.

Figure 5:
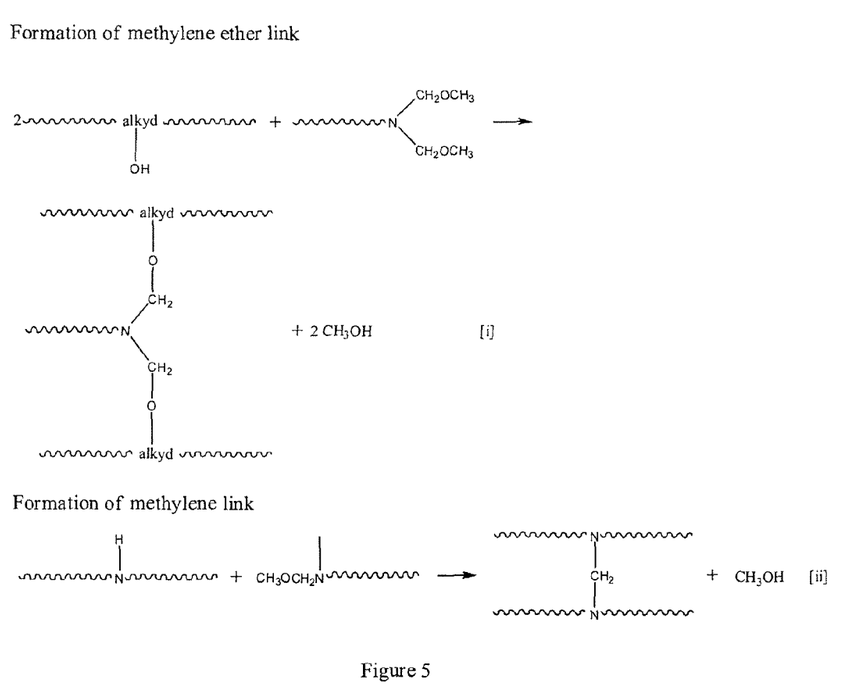
FIG. 5 is a reaction scheme for (i) the formation of a methylene ether link from a hydroxyl alkyd resin and melamine functionality; and (ii) the formation of a methylene link from a reactive amine and a melamine functionality.

FIG. 5 shows reaction scheme for the reactions of crosslinker melamines and alkyd functional groups, which may be on the matrix polymer. Such reactions can be used as a crosslinking reaction in conjunction with other crosslinking mechanisms such as crosslinking of an alkyd resin unsaturated moiety using a drier (e.g., Mg). In such instances, a first crosslinking step reacts the OH group and melamine to form the reaction product shown in FIG. 5(i). Thereafter a drier is added to promote self-crosslink of alkyd resin backbone.

Reaction scheme (ii) in FIG. 5 illustrates another reaction of melamine, this time with a reactive amine group.

In other embodiments, the crosslinker is a functionalized silane. The silane undergoes a first crosslinking reaction generating new functional groups. In some embodiments, a secondary crosslinker may not be needed, as the silane itself may contain a second group that can function as the second crosslinker. The silane methoxy group (—$OCH_3$) reacts with a hydroxyl group (—OH) to form oxy-silane (losing methanol). The other end of the silane can be epoxy, amine, unsaturated, sulfhydryl, isocyanate, or carboxylic acid which can then react with other groups on the backbone and/or the substrate.

In some embodiments, one of the crosslinking mechanisms can be a self-crosslinking mechanism. Crosslinks may be polymer-polymer self-crosslinks such as those of a self-condensing n-methylolacrylamide, or unsaturated polymer. Polymer-polymer self-crosslinking may be used in conjunctions with any of the other crosslinking mechanisms described herein.

As noted previously, sequential reactions may be controlled by localizing different crosslinkers in different phases of the polymer emulsion. The crosslinkers noted herein may be used according to one or more embodiments. By way of example, aziridine or isocyanate can mix into a urethane micelle and an emulsified epoxy or other urethane incompatible material would remain dispersed in the aqueous phase until the coating dries and both phases mix.

In other cases the coating/adhesive may have unsaturation that provides the second crosslinking functionality that can be UV light activated by an initiator system or oxidatively cured. An example is a polyurethane polymer containing both unsaturation and acid features. Sequential crosslinking is achieved using aziridine as the crosslinker. For example, the aziridine crosslinker reacts with the acid functionalities at ambient and is subsequently further crosslinked through the polymer sites of unsaturation using heat, driers or UV. Stronger coatings are derived by using both functionalities.

Figure 1:
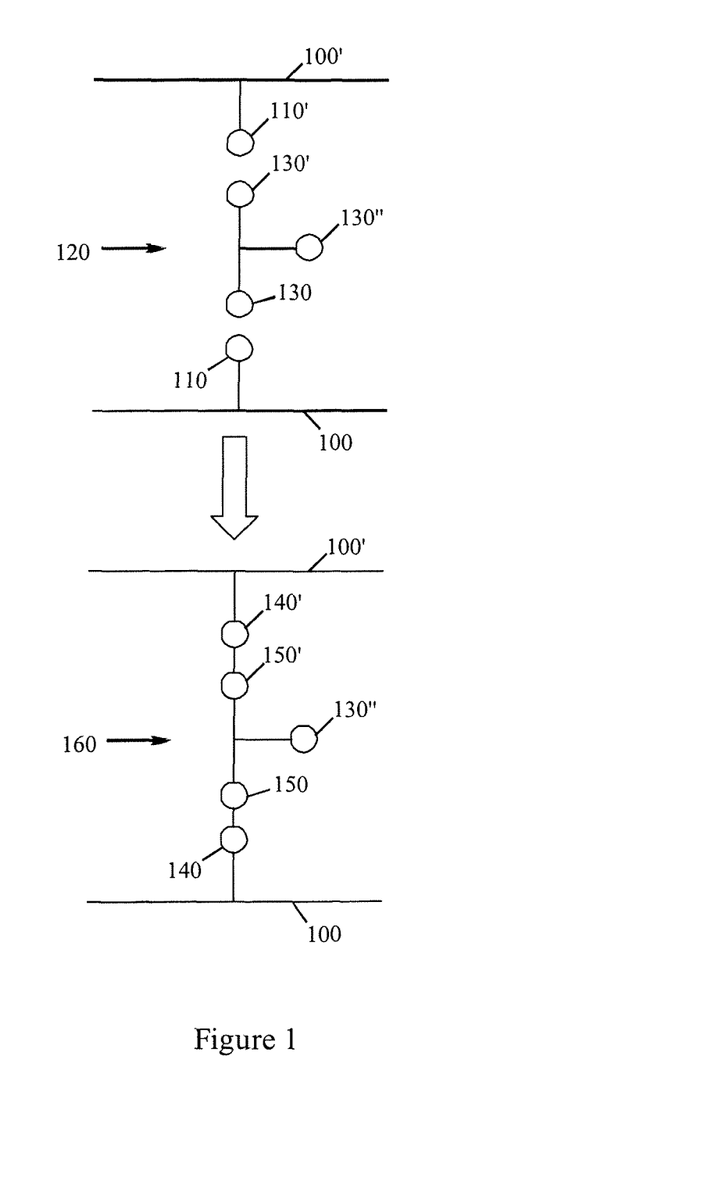
FIG. 1 is a schematic illustration of the first crosslink mode in a coating composition according to one or more embodiments of the invention.

The coating system may be understood with reference to FIG. 1, which illustrates a coating resin and crosslinking system having multiple modes of crosslinking. FIG. 1 illustrates a first polymer chain 100 and a second polymer chain 100', each having a plurality of functional moieties 110, 110' capable of undergoing a crosslinking reaction with crosslinker 120. Crosslinker 120 may contain multiple reactive moieties 130, 130', 130" capable of reacting with polymer functional moieties 110 and/or 110' to form a bridging crosslink between polymer chains, as illustrated in FIG. 1, thereby forming a crosslinked polymer 160. It will be appreciated that groups 110 and 130 and groups 110' and 130' may be chemically modified during this chemical transformation, e.g., into modified groups 140 and 150, and groups 140' and 150', respectively. The crosslinking reaction generates a different reactive group at one or both linking moieties 140 and/or 150. This represents an example of the first linking mode.

Figure 2:
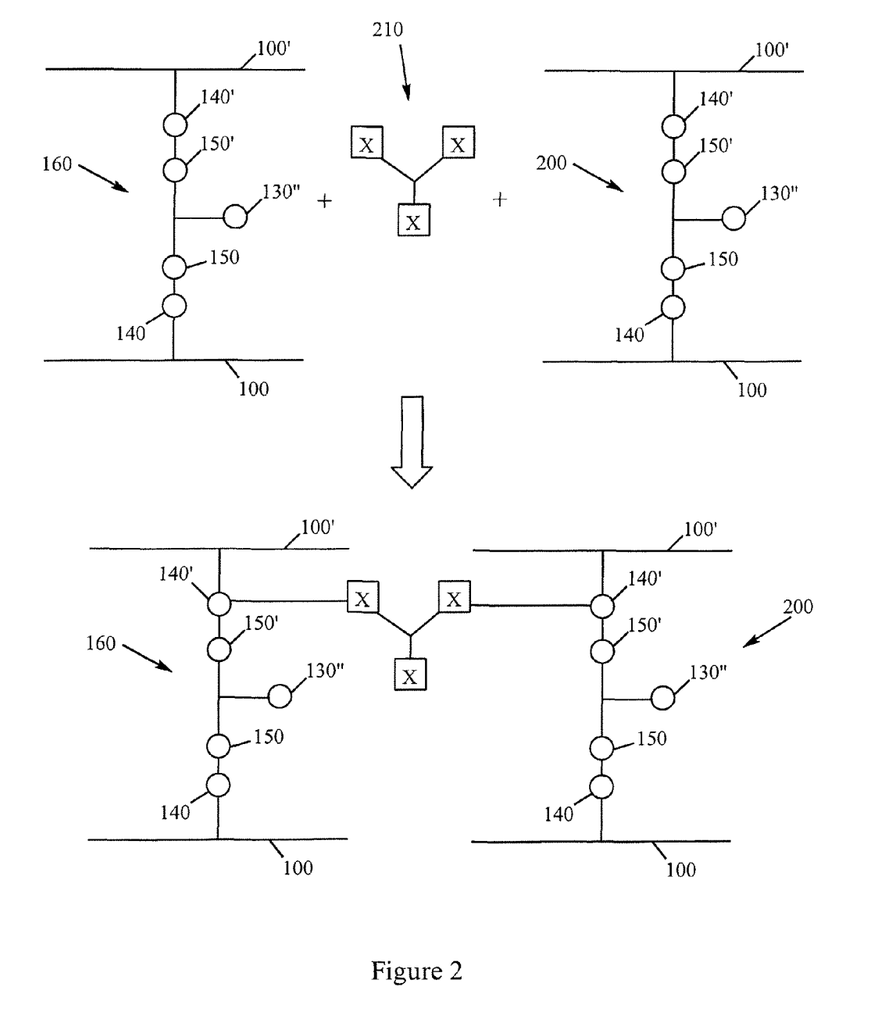
FIG. 2 is a schematic illustration of the second crosslink mode according to one or more embodiments of the invention.
Figure 4:
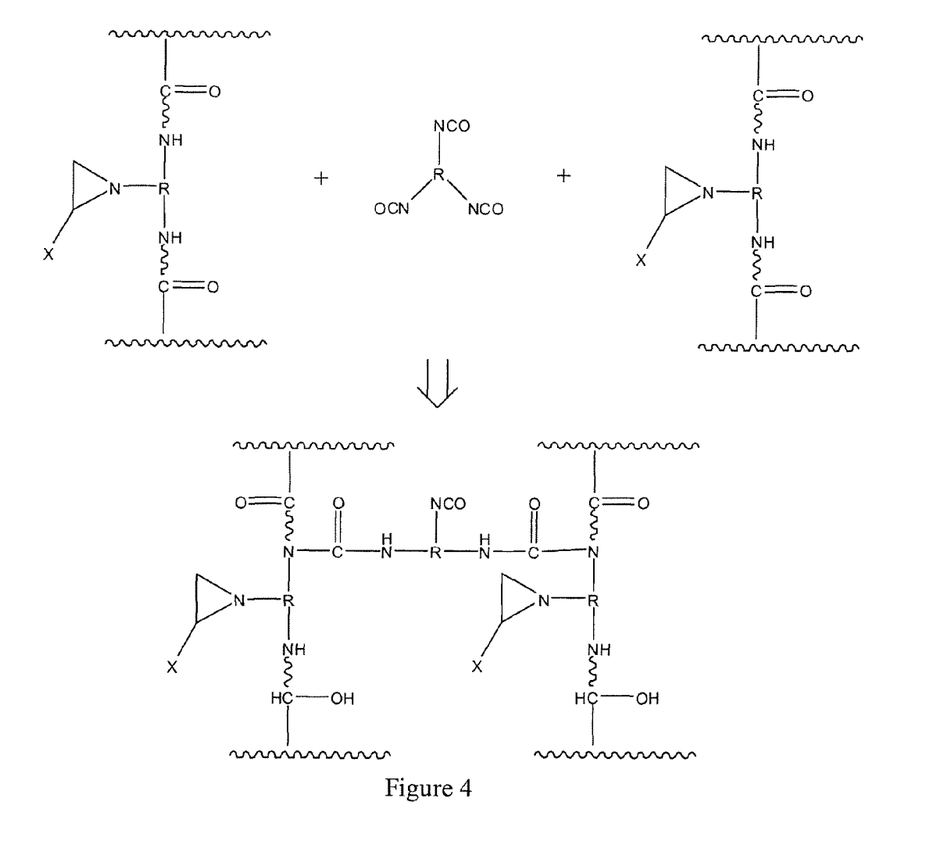
FIG. 4 illustrates the reaction of an aziridine-crosslinked polymer with a polyfunctional isocyanate crosslinker according to one or more embodiments of the invention.

In FIG. 2, the second crosslinker may be present in the coating composition as applied, yet it does not react with the functional groups 110, 110' of the polymer backbone. That is, the second crosslinker is stable or unreactive in the coating composition until a new reactive group is generated in the first crosslinking step. The reactive functional groups of 140, 140' and/or 150, 150' of polymer chain 160 can then undergo further crosslinking reactions, for example, with a second crosslinker 210 that is reactive to the newly generated reactive groups and not the functional moieties of the matrix polymer. Neighboring polymer chain 200 can react with the second crosslinker. Polymer chain 200 can be a crosslinked polymer chain as is illustrated in FIG. 2 including reactive linking moiety 140, 140' and/or a reactive linking moiety 150, 150'.

form a second crosslink. FIG. 4 illustrates the further reaction of the aziridine crosslinked polymers with a polyisocyanate crosslinker. The NH groups react with the isocyanate to form a urea link. In this reaction sequence, both the aziridine and the isocyanate crosslinkers are present in the initial coating composition. However, only the aziridine is sufficiently reactive to crosslink with the urethane polymer. The isocyanate forms crosslinks with the polymer only after aziridine reaction, thus resulting in a controlled sequential crosslinking reaction from a single coating composition.

A non-limiting exemplary list of the combinations of different crosslinking modalities that may be used are found in Table 1.

| Polymer functionality | First Crosslink Step | Second Crosslink Step |
|---|---|---|
| Unsaturation, Reactive functional group | UV or oxidative | Chemical Crosslink (chosen to be reactive to functional groups generated during uv or oxidation or groups present on the backbone) |
| Unsaturation, Acid Reactive functional group | Urethane acrylate, AlkydFatty Acid Chemical crosslink #1 | Carbodiimide, melamine, epoxy, isocyanate, aziridine Chemical crosslink #2 |
| Acid | Aziridine | Carbodiimide, melamine (heat activated), epoxy, isocyanate |
| Amine | Epoxy | Isocyanate Carbodiimide, melamine (heat activated), silane |
| Amine, thiol, hydroxyl | Isocyanate | Aziridine, carbodiimide, melamine, epoxy |
| Acid | Aziridine | Blocked isocyanate or melamine blocked catalyst (react on deblocking) |
|  | Silane with functional groups | Aziridine, carbodiimide, melamine, epoxy, isocyanate, and unsaturati-on (from silane or second crosslinker) |
| Self-crosslinking_Acid | Self-crosslinking | Crosslinker as above |
| NMethylolacrylamide (NMAAm) | Self-crosslinking acrylic | Aziridine, carbodiimide, melamine, epoxy, isocyanate |

Reactive moiety 130" of polymer chain 160 can react with a reactive group in polymer chain 200, illustrated here as reactive groups 140, 140' and 150, 150'. The represents the second crosslink mode. In other embodiments, the newly formed reactive groups 140, 140' and 150, 150' of polymer chain 160 can react with unreacted functional moieties 110, 110' of a polymer chain 100 (not shown), as yet another embodiment of a second crosslinking mode.

Until there is no more mobility, all the functional groups 110, 100' can theoretically react with the second crosslinker around them on the backbone or the substrate. Molecular mobility and non-sterically hindered reactions provide for a highly networked polymer matrix.

Figure 3:
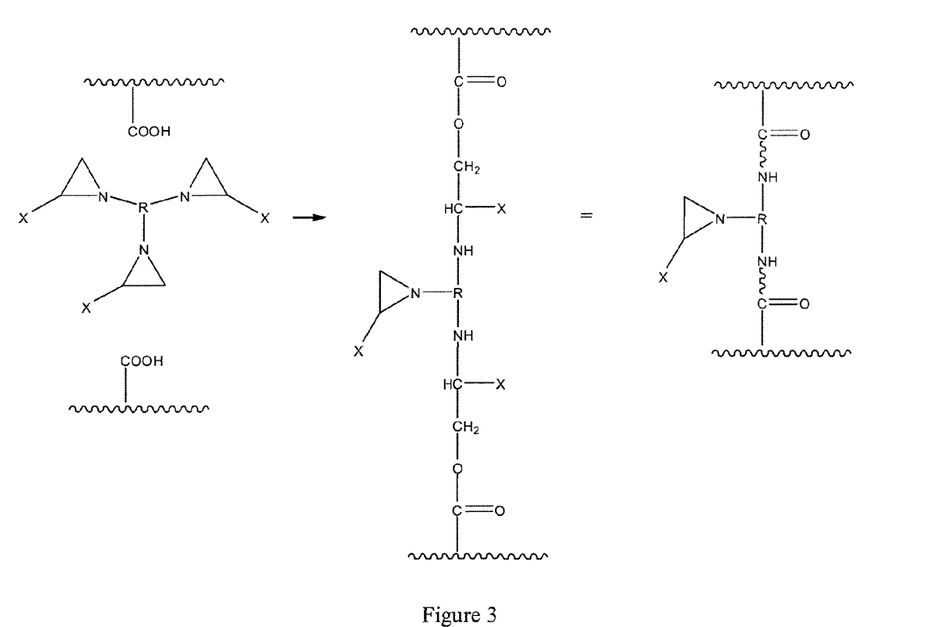
FIG. 3 illustrates the reaction of an acid functionalized polymer with a polyfunctional aziridine crosslinker according to one or more embodiments of the invention.

In a particular example, illustrated in FIG. 3, the polymer is a polyurethane polymer functionalized with organic acid functionalities (having a COOH reactive functional group). The crosslinking agent is a multifunctional crosslinking agent, such as a functionalized aziridine. For example, FIG. 3 illustrates an embodiment in which the crosslinking agent is CX-100 (a polyfunctional aziridine cross-linker available from DSM-Neoresins, Wilmington, Mass.). The acid function reacts with available aziridine functionalities to link two adjacent urethane polymers, generating reactive NH sites along the length of the crosslink.

These reactive NH groups may either react with a second crosslinker, e.g., a polyfunctional isocyanate crosslinker, to In the table above, reaction temperatures and rate may vary, thereby making it possible to control crosslinking steps by controlling reaction temperature. The following crosslink reactions occur rapidly at ambient during drying: epoxy/amine, aziridine/acid, silane/reactive groups, carbodiimide/acid, self-crosslinking NMAAm, and moisture cure self-crosslinking. Heat accelerates them all except silane and moisture cure. Longer reaction times at ambient are expected with epoxy/acid systems. Some moisture cures associated with silanes and isocyanate. High temperature/UV reactions are needed for reactions with melamine, unsaturated initiated acrylics, and blocked catalysts, uncatalyzed aliphatic isocyanates.

In addition to the foregoing, the crosslinker is selected from the group consisting of aziridines, carbodiimides, epoxides, unsaturated carbon-carbon and heteroatom bonds, isocyanates, silanes, N-methylolacrylamine self condensing groups, titanate or zirconate or zircoaluminates, blocked crosslinkers and catalysts, moisture activated additives, ionic di- or multi-valent agents and melamine/urea condensates. Note that some crosslinkers may self-condense to form networks around and within networks. Isocyanate can condense with the reaction of itself and water, losing $CO_2$. Melamines can self condense as well.

The matrix polymer can be any film forming natural or synthetic coating or adhesive resin such as: acrylic, urethane ester, ether, alkyd, PVC or other polymer formed by addition or condensation polymerization that contains functional groups. In certain embodiments, the matrix polymer may be selected from the group consisting of polyacrylates, polymethacrylates, polyurethanes, polyethylene and polypropylene co-difunctional polymers, polyvinyl chlorides, acrylamide, styrene and other vinyl copolymers, epoxides, polyamides, polyesters and alkyd copolymers. The functional moiety may be selected from the group consisting of amino, hydroxyl, amido, carboxylic acid and derivatives thereof, sulfhydryl (SH), unsaturated carbon bond and heteroatom bonds, N—COOH, N(C=O)H, S(OR), alkyd/dry resin, formaldehyde condensate, methyol acrylamides and allylic groups.

In one embodiment the dispersed or emulsified multifunctional polymeric carrier is a modified polymeric urethane, urea, ester, ether, carbonate, vinyl, acrylic, methacrylic, alkyd, acrylamide, maleic anhydride, an epoxy prepolymer and related polymers or a combination thereof. These can be modified by inclusion of coreactants that are anchored and distributed along the back bone of the resin to further react. For example to introduce vinyl unsaturation in a urethane one adds unsaturated reactive monomers such as OH, functional HEMA or HPMA or difunctional OH containing monomers to build molecular weight with pendant unsaturation. Alternatively $NH_2$ functionality, or difunctional OH unsaturated monomers and fatty acid derivative diols can be used in a similar fashion. To introduce a COOH functionality in a urethane one adds DMPA. Certain polymers inherently have active hydrogens of varying reactivities along the backbone. These can be accentuated or modified by reactive gas containing plasma pretreatments as well. For example, oxygen gas plasma can increase the number of OH and —COOH groups at the polymer surface. Other gases can be used to increase and/or introduce other functionality.

In one embodiment the hydrophilic organic monomer, oligomer, prepolymer or copolymer is derived from vinyl alcohol, N-vinylpyrrolidone, N-vinyl lactam, acrylamide, amide, styrenesulfonic acid, combination of vinylbutyral and N-vinylpyrrolidone, hydroxyethyl methacrylate, acrylic acid, vinylmethyl ether, vinylpyridylium halide, melamine, maleic anhydride/methyl vinyl ether, vinylpyridine, ethyleneoxide, ethyleneoxide ethylene imine, glycol, vinyl acetate, vinyl acetate/crotonic acid, methyl cellulose, ethyl cellulose, carboxymethyl cellulose, hydroxyethyl cellulose, hydroxypropyl cellulose, hydroxymethyl ethyl cellulose, hydroxypropylmethyl cellulose, cellulose acetate, cellulose nitrate, starch, gelatin, albumin, casein, gum, alginate, hydroxyethyl (meth)acrylate, hydroxypropyl (meth)acrylate, ethylene glycol (meth)acrylates (e.g. triethylene glycol (meth)acrylate) and meth)acrylamide), N-alkyl (meth)acrylamides (e.g. N-methyl (meth)acrylamide and N-hexyl (meth)acrylamide), N,N-dialkyl (meth)acrylamides (e.g. N,N-dimethyl (meth)acrylamide and poly-N,N-dipropyl (meth)acrylamide), N-hydroxyalkyl (meth)acrylamide polymers, such as poly-N-methylol (meth)acrylamide and poly-N-hydroxy ethyl (meth)acrylamide, and N,N-dihydroxyalkyl (meth)acrylamide polymers, such as poly-N,N-dihydroxyethyl (meth) acrylamide, ether polyols, polyethylene oxide, polypropylene oxide, and poly(vinyl ether), alkylvinyl sulfones, alkylvinylsulfone-acrylates and related compounds or a combination thereof.

A coating composition for use in coating an article comprises an aqueous mixture of a hydrophilic polymer and a supporting polymer having functional groups capable of undergoing crosslinking reactions. The supporting polymer and hydrophilic polymer are well blended and form an association complex in the aqueous-based medium. The association of the two polymer types may be preserved and maintained by crosslinking the functional moieties of the supporting polymer to form a three dimensional polymer network. The three dimensional network entrains and immobilizes the hydrophilic polymer within the coating to minimize its loss to the environment when wet, without interfering with the hydrophilic properties of the hydrophilic polymer. The retention of the hydrophilic polymer in the polymer coating is qualitatively determined by retention of the slippery feel of the coating when wet and/or when rubbed. This may be denoted as the "retained slip" of the hydrophilic coating.

The coating composition may also include a bioeffecting agent that can be attached to the matrix polymer backbone or to a substrate with an anchor provided by a linker compound which also forms a cleavable linkage with the bioeffecting agent so that the bioeffecting agent's release into the area surrounding the substrate occurs in a sustained manner over an extended period of time. The bioeffecting agent may be attached to a substrate using a cleavable linkage and an anchor. The components forming the multicomponent complex are selected to form a cleavable linkage and an anchor such that the release of the bioeffecting agent is sustained over time. The bioeffecting domain component is supplied by a bioeffecting agent. The segment component containing at least two linking domains is supplied by a linker compound. The anchoring moiety component is associated with the substrate, and may be supplied by the substrate or another compound placed in close proximity to the substrate.

The "bioeffecting agent" may include a material which engages in biological activity or is effective in modulating a biological activity. A bioeffecting agent may exhibit therapeutic, prophylactic or diagnostic effects in humans, animals, insects and plants. Agents may be proteins, peptides, polysaccharides, enzymes, drugs, vaccines, vitamins, mineral complexes, sunscreens or nutritional supplements. Preferred materials exhibit antithrombogenic, antimicrobial, antihypertensive, anticarcinogenic, anticonvulsive, antiinflammatory, analgesic, antifibrotic, cell growth or cell inhibition, or other properties. Agents may be used to treat a variety of disease states including Parkinson's Disease, Alzheimer's Disease, and any form of diabetes. Preferred materials include ferrochrome A, erythropoietin, growth hormone, insulin, vitamin C, aspirin and heparin. Particularly preferred materials are anticoagulant compounds and proteins which affect cell growth in humans. A most particularly preferred compound is ammonium heparin. Further detail of suitable linked bioeffecting agents may be found in U.S. Pat. No. 6,683,062, entitled "Multicomponent Complex for Use with a Substrate," which is incorporated herein by reference.

The coating resin and crosslinking system may optionally include additives or fillers. Exemplary fillers, without limiting the field, can be hydrophilic polymers or other slip additives, radiopaque or light modifying additives, drugs or bioactive materials which may or may not react into the polymer resin or substrate through the crosslinking reactions (See, U.S. Pat. No. 6,683,062). By way of example, the auxiliary agent is selected from a solvent, surfactant or wetting agent, emulsifier, dye, pigment, colorant, UV absorber, radical scavenger, antioxidant, anti-corrosion agent, optical brightener, fluorescers, bleaches, bleach activators, bleach catalysts, non-activated enzymes, enzyme stabilizing systems, chelants, coating aid, metal catalyst, metal oxide catalyst, organometallic catalyst, filmforming promoter, hardener, linking accelerator, flow agent, leveling agent, defoaming agent, lubricant, matte particle, rheological modifier, thickener, conductive or non-conductive metal oxide particle, magnetic particle, anti-static agent, pH control agents, perfumes, preservative, biocide, pesticide, anti-fouling agent, algicide, bactericide, germicides, disinfectant, fungicide, bio-effecting agent, vitamin, drug, therapeutic agent or a combination thereof.

In one or more embodiments, the coating is applied to a surface. Typical methods of application may be used, as is known in the art. The coating composition may be applied to an article using conventional coating techniques, such as dip coating, roll coating, spray coating and the like. In a dip coating process, the article is immersed in a bath containing the coating composition and then removed. A dwelling time, for example, as short as one second and as long as one hour may be used depending of the material of construction, complexity of the device and the desired coating thickness. Typical coating thicknesses are in the range of about 0.0001" to about 0.005" (0.1-5 mil). The wet coated article may be coated by any conventional method and may be allowed to dry to provide a dry coating. Drying may be accomplished merely by standing at ambient conditions or may be accelerated by heating at mild temperatures, such as 30° C.-100° C. Higher temperature crosslink agents and/or uv initiation may be needed. Films, foams and particles may be formed from the coating to actually become the product.

Once applied, the coating may be "locked" in place by crosslinking of the supporting polymer to form a three-dimensional network. The crosslink reaction may occur before, during or after the drying step, but most typically occurs during or after the drying step. Crosslink density in the product hydrophilic coating will vary significantly with the nature of the supporting polymer and the crosslink agent, as well as the conditions and duration of curing.

The coating may be applied to a virtually unlimited variety of substrates. The substrates may be solid, woven or porous. Exemplary substrates include polyether block amides, polyethylene terephthalate, polyetherurethane, polystyrene, natural and synthetic rubbers, silicone rubbers, rubber latex, polyester-polyether copolymers, ethylene methacrylic acid di- and interpolymers containing metal salts, PEEK, PCK, polyethers, polyesters, and other polyurethanes, polyecarbonates, polytetramethylene glycol ether urethane and other organic materials including polyvinyl chloride and other vinyl polymers, polyethylene and the like, as well as blends and alloys of the above. Other substrates include metals, such as stainless steel, nickel, nickel cobalt alloys, titanium, NiTi alloy, aluminum tantalum, platinum, gold, silver, ceramic, glasses and tungsten.

The coating composition may also be blown into hydrophilic foams using conventional techniques, such as incorporation of azides, heat-expanding particles of encapsulated low boiling materials (Expancel, Akzo-Nobel) or swelling encapsulated low boiling liquids that blow gas into the composition. Frothing with agitation of a stabilized foaming formula can yield effective foams cast in film or mold. Open celled foams and films of various compositions may be useful in a number of water or hydrophile absorbing applications, such as a sponge or filtration media or padding of, or adhesion to, delicate water-containing organisms or tissues. Similarly particles maybe prepared by spray drying with utility in implantation for swelling to occlude AV fistula or arteries which feed tumors.

In one or more embodiments, the surface to be coated may be subject to pretreatments for adhesion, such as without limitation, primers, etching, plasma or corona, flame or other treatments. Adhesion between coating/adhesive and article being coated can be improved by the ability of the reactive species in the linking moieties to react with the functions on the substrates. These can be native functions, or functionality placed on the surface by typical priming, pretreats and etches. Use of gases can impact the surface prepared from plasma coatings. Ammonia yielding amination, acetic acid yielding acid functions, etc. Priming with silanes can place almost any moiety on a glass or metal surface.

For the following examples water-based urethanes have been used. However this use is not intended to restrict the chemistry to either water-based- or urethane-only systems. Solvent based, 100% solids, powder and oligomeric systems are capable of undergoing similar reactions. Acrylic, epoxy, polyester, polyamid, urethane, alkyd and other resins are capable of being prepared such that the functional groups and subsequent crosslinking agents may be useful.

Example 1

A 1:1 urethane to PVP coating solution was prepared by the addition of 0.3 g of CX 100 (a polyfunctional aziridine crosslinker, available from DSM-Neoresins, Wilmington, Mass.) to 10 g of L2391 an aliphatic urethane supplied at 40% solids (CL Hauthaway and Sons Lynn Mass.). To this was added 43 grams of a 10% solids solution of PVP K-90 (ISP NJ) in distilled water. The film was flow coated onto an aluminum panel and allowed to dry 4 days at ambient.

To the remaining solution described above, was added 0.4 g XP7063 (polyisocyanate is derived from a hydrophilic modified hexamethylene diisocyanate trimer, available from Bayer Pittsburg Pa.). The same flow coating was prepared on identical Q panel bare aluminum panels and cured for the same period as the material prepared with only the CX 100 crosslinker.

At 4 day cure the panels were immersed in water and held until adhesion problems occurred as indicated by blistering. The material crosslinked with both CX 100 and XP7063 was intact at 24 hours, where the CX100 alone blistered and peeled at 2 hours. Both films were slippery. But adhesion was markedly different with the latter.

Example 2

To 10 g of R9621 (a urethane dispersion such as the aliphatic polyester waterborne urethane dispersions) resin 38% in water (DSM Neoresins Wilmington Mass.) was added 6.34 g of 10% solids PVP K90 (ISP) in distilled water and 0.1 g of CX 100 (DSM Neoresins), thereby forming a ⅔ urethane to PVP coating.

The coating was dip coated on latex Foley catheters and dried at 60 C. for 5 hours. The resultant catheter was slick and lubricious.

a) The remaining solution was treated with 0.4 g of XP7063 (Bayer Pittsburg Pa.) and dip coated and cured identically with the above latex Foleys. The resultant coating was not as slick indicating too tightly crosslinked a coating.

b) To the solution containing both crosslinkers was added sufficient PVP to bring the ratio of 1 part urethane to 2 parts PVP by weight. After coating and curing the films were tough and slippery. Additional PVP can be tolerated in the dual crosslinked coating.

Example 3

A 1:1 version of the above system was prepared by mixing 1.90 g of PVP K90 with 23.3 g of distilled water. To this mixture were added 5 g of the same resin R9621 at 38% solids (DSM Neoresins Wilmington Mass.). 10 grams of this mixture was then crosslinked with and 0.1 g CX100 (DSM Neoresins Wilmington Mass.) and 0.3 g XP7063 (Bayer Pittsburg Pa.).

Urethane jacketed nitinol wires were coated with this solution by dip and cured 5 hours at 160 F. The coating adhered well to the wire and was adherent and strong.

A similar version of this was prepared with only CX100, dipped and cured on the same wires. The coating was soft and scraped off easily when wet.

Example 4

Improved hardness with good flexibility.

8.6 g of a urethane with vinyl unsaturation for radical curing, and pendant carboxyl groups R440 (DSM Neoresins Wilmington Mass.) was mixed with 12.77 g of a 10% PVP K-90 (ISP) distilled water. giving a 2/1 urethane to PVP ratio.

A) 0.2 g of UV radical initiator Darocur 1173 premixed 1/1 in isopropanol (Fisher) was added at recommended levels and flow coated on Aluminum panels. After UV curing the film was slick but scratched easily.

B) An identical urethane solution was treated with 0.076 g of CX100 (DSM Neoresins Wilmington Mass.) flow coated on aluminum panels and cured at 205 F. 1 hour. The resulting film dissolved in water.

The mixture of the individual urethane solutions in 1/1 proportion so that the coating was curing by both UV and aziridine crosslinking and subjected to UV curing on aluminum panels. The resultant film was hard, durable and slick. A scratch did not penetrate the surface. Note that CX100 is an ambient cure crosslinker that does not require heat. Also note that the Darocur can initiate with high temperatures to form radicals and behave and a thermal initiator as well as a UV initiator.

Example 5

A water-based urethane containing carboxyl groups is prepared with an aziridine crosslinker and epoxy crosslinker.

The aziridine reacts instantly with the freed carboxylic acid which forms a hydroxyl and secondary amine which can then react with the epoxy. Water resistance and abrasion resistance should be recognized in this manner as well as the ability to load the higher crosslinked films.

Example 6

The urethane of Example 5 is reacted with an aziridine crosslinker and a melamine crosslinker. The more latent melamine reacts with the same OH and NH groups formed by the crosslinking of the aziridine with carboxylic acid groups.

Example 7

The urethane of Example 5 is treated with epoxy functional silane with water-stabilized silane functionality. After 3 days the coating solution is dried and the silane condenses with —OH's on the backbone and metal oxides/hydroxide on the substrate surface.

Example 8

A carbodiimide is reacted with the urethane of Example 5. The resulting functionality can be reacted with isocyanate, epoxy and melamine functionality.

Example 9

An acrylic emulsion with MAA and AA in the backbone is reacted in a similar fashion to those urethanes with carboxylic acid.

Example 10

An alkyd urethane with unsaturation is treated with driers know to catalyze the oxidative crosslinking of the unsaturated fatty acid. The network is also reactive with Melamine Example 11

A water-based urethane containing carboxyl groups is prepared with an epoxy crosslinker and an isocyanate crosslinker.

The epoxy reacts with the freed carboxylic acid which forms a hydroxyl which can then react with the isocyanate. Water resistance and abrasion resistance should be recognized in this manner as well as the ability to load the higher crosslinked films.

As will be apparent to one of skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:

1. A method of coating a surface comprising:
providing a coating composition to a surface, said composition comprising:
a matrix polymer containing a polymer selected from the group consisting of acid functionalized urethane and acid functionalized acrylic polymer, said matrix polymer dispersed or emulsified in a continuous aqueous phase and said acid functionalities neutralized with a counterion to remain unreactive in the aqueous phase; and
first and second crosslinkers,
wherein the first crosslinker comprises a moiety selected from the group consisting of aziridines, functionalized silanes, carbodiimides, and epoxies and the second crosslinker comprises a moiety selected from the group consisting of isocyanates, epoxies, carbodiimides, aziridines and melamines, selected such that the second crosslinker is stable or non-reactive under conditions sufficient to form a crosslink with the first crosslinker;
removing the counterion to provide a reactive acid moiety;
forming a crosslink with the first crosslinker and the reactive acid moiety in a first crosslinking step, wherein the first crosslinking step generates a first crosslink comprising a reactive moiety that is capable of undergoing subsequent crosslinking with the second crosslinker; and
subsequently forming a second crosslink with the second crosslinker and the reactive moiety of the crosslinked matrix polymer in a second crosslinking step.

2. The method of claim 1, wherein the first crosslinker is selected from the group consisting of aziridines, and epoxies.

3. The method of claim 1, wherein the first crosslinker comprises aziridine and the second crosslinker is selected from the group consisting of melamines, epoxies, isocyanates, and carbodiimides.

4. The method of claim 1, wherein the first crosslinker is soluble with the matrix polymer and the second crosslinker is substantially located in the aqueous continuous phase.

5. The method of claim 1, wherein the coating composition further comprises a hydrophilic water-soluble organic monomer, oligomer, prepolymer, polymer or copolymer selected from the group consisting of vinyl alcohol, N-vinylpyrrolidone, N-vinyl lactam, acrylamide, amide, styrenesulfonic acid, combination of vinylbutyral and N-vinylpyrrolidone, hydroxyethyl methacrylate, acrylic acid, vinylmethyl ether, vinylpyridylium halide, melamine, maleic anhydride/methyl vinyl ether, vinylpyridine, ethyleneoxide, ethyleneoxide ethylene imine, glycol, vinyl acetate, vinyl acetate/crotonic acid, methyl cellulose, ethyl cellulose, carboxymethyl cellulose, hydroxyethyl cellulose, hydroxypropyl cellulose, hydroxymethyl ethyl cellulose, hydroxypropylmethyl cellulose, cellulose acetate, cellulose nitrate, starch, gelatin, albumin, casein, gum, alginate, hydroxyethyl (meth)acrylate, hydroxypropyl (meth)acrylate, ethylene glycol (meth)acrylates, N-alkyl (meth)acrylamides, N,N-dialkyl (meth)acrylamides, N-hydroxyalkyl (meth)acrylamide polymers, and N,N-dihydroxyalkyl (meth)acrylamide polymers, ether polyols, polyethylene oxide, polypropylene oxide, and poly(vinyl ether), alkylvinyl sulfones, alkylvinylsulfone-acrylates or a combination thereof.

6. The method of claim 1, wherein the first crosslinking step is carried out at a first lower temperature and the second crosslinking step is carried out at a second higher temperature, wherein the second crosslinker is not reactive at the first lower temperature.

7. The method of claim 1, wherein the first crosslinker is aziridine and the second crosslinker is melamine.

8. The method of claim 1, wherein the first crosslinker and the second crosslinker are located on a single compound and the compound includes a free reactive group and a blocked reactive group or a reactive group that is non-reactive under conditions sufficient to form a crosslink with the free reactive group and the matrix polymer, and wherein the first crosslinking step is carried out with the free reactive group to form a first crosslink, and the second crosslinking step comprises removing the block or changing the reaction conditions to obtain a second reactive group and forming a crosslink with the second crosslinker and the crosslinked matrix polymer.

9. The method of claim 1, wherein the coating composition is applied to the surface in a single application.

10. The method of claim 1, wherein the coating composition further comprising a hydrophilic polymer and the hydrophilic polymer is selected from the group consisting of a hydrophilic water-soluble organic polymers and copolymers.

11. The method of claim 1, wherein the coating composition further comprising a bioactive material and the bioactive materials is one or more material selected from the group consisting of proteins, peptides, polysaccharides, enzymes, drugs, vaccines, vitamins, mineral complexes, sunscreens, analgesics, antithrombogenic agents, antimicrobial agents, antihypertensive agents, anticarcinogenic agents, anticonvulsive agents, anti-inflammatory agents, antifibrotic agents, cell growth agents, cell inhibition agents, ferrochrome A, erythropoietin, growth hormone, insulin, vitamin C, aspirin, heparin and nutritional supplements.

12. The method of claim 1, wherein forming the second crosslink is activated by a change in reaction condition selected from the group consisting of heat and pH.

13. The method of claim 1, wherein the reactive acid moiety is COOH.

14. The method of claim 1, wherein the first crosslinker is aziridine and the second crosslinker is isocyanate.

15. The method of claim 1, wherein the first crosslinker is epoxy and the second crosslinker is selected from isocyanate, melamine.

* * * * *